United States Patent Office 3,635,999
Patented Jan. 18, 1972

3,635,999
SYNTHESIS OF OXAZOLES
Bernard Tramier and Albert Bonzom, Marseille, France, assignors to Societe Nationale des Petroles d'Aquitaine, Courbevoie, France
No Drawing. Filed Mar. 25, 1969, Ser. No. 810,339
Int. Cl. C07d 85/44
U.S. Cl. 260—307 R         11 Claims

ABSTRACT OF THE DISCLOSURE

New oxazoles are prepared having the formula

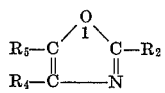

where $R_2$ is alkyl of 1 to 6 carbon atoms, phenyl or hydroxyphenyl, $R_4$ is methyl and $R_5$ is hydrogen. A process of preparing oxazoles is disclosed comprising condensing an acetylenic compound having an electronegative group on the carbon atom in the $\alpha$-position relative to the triple bond with an ammonium salt of an organic acid or an amide.

---

The present invention relates to a new process for the preparation of oxazoles; it is concerned more particularly with the synthesis of these compounds from derivatives of acetylenic alcohols. The invention also covers certain new substituted oxazoles, particularly monosubstituted and disubstituted oxazoles.

The oxazoles are heterocyclic compounds of the type

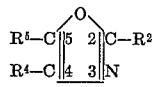

in which $R^2$, $R^4$ and $R^5$, like or different, can be hydrogen atoms or radicals such as alkyl, alkenyl, aryl, cycloalkyl radicals, heterocyclic radicals, etc. These compounds are of industrial interest: they serve particularly as intermediate products in the preparation of medicines, dyes and plastic materials. They can be converted into imidazoles by the action of ammonia and can thus serve as initial material in the manufacture of copolymers of vinyl-imidazoles with, for example, acrylates. Moreover, since the first preparation of phenyl oxazole by Zinin in 1840, numerous authors have experimented with various methods for the synthesis of oxazoles; however, none of these has become of industrial significance. Recently, a process was proposed which consisted in causing a carboxylic acid amide to react with an acetylenic alcohol carrying a secondary carbinol group in the $\alpha$-$\beta$-position relatively to the triple bond; the reaction is carried out at temperatures higher than 100°, in the presence of a mercury salt, in a carboxylic acid or an inert solvent, such as for example xylene. This process seems to give better yields than the old methods, but it still has the disadvantage of being carried out with fairly small conversion rates with respect to the amide, which has to be separated and recycled; as regards the yield based on acetylenic alcohol, it does not in practice reach 50%. On the other hand, the process in question generally requires a very long heating period lasting several tens of hours, and this is clearly not very practical from the industrial point of view. Finally, if it permits trisubstituted oxazoles to be obtained, it is unsuitable for the preparation of monosubstituted or disubstituted derivatives; in actual fact, under the working conditions of this process, the primary acetylenic alcohols do not in practice provide the desired oxazole.

The present invention provides a very substantial advance in the convenient manufacture of oxazoles: it permits yields to be reached which, relatively to each of the reactants being used, are sufficiently high to make the operation economical; it enables the reaction to be carried out in a particularly acceptable time, for example, of the order of 4 to 10 hours. Another advantage of the new process is the ability to be able to provide trisubstituted oxazoles as well as monosubstituted or disubstituted oxazoles. When it is a question of obtaining trisubstituted oxazoles, the new process permits yields exceeding 70% to be reached; the preparation of the monosubstituted and disubstituted compounds, although slightly less economic, is carried out with suitable yields, which may reach or exceed 50%.

The new process according to the invention consists in causing an amide, or an ammonium salt of the corresponding carboxylic acid, to react with an acetylenic compound which carries an electro-negative group in the $\alpha$-position relatively to the triple bond. The acetylenic compound can more particularly result from the condensation, with elimination of water, of an $\alpha$-acetylenic alcohol and a reactant such as acid or other reactant, the said electro-negative grouping being formed by this condensation.

The reaction takes place in a solvent which is preferably formed by an acid; the best results are obtained in anhydrous medium, preferably a dehydrating medium.

According to one particularly important feature of the invention, the solvent being used is anhydrous polyphosphoric acid. The concentration of the reactants in the solution is generally of the order of 10 to 70% and usually about 30 to 60% by weight.

According to another preferred feature of the invention, the said electro-negative grouping of the acetylenic compound being used is an acyl, which can originate from any carboxylic acid; for economic and technical reasons, acetic acid is particularly advantageous, and the practical form of procedure according to the invention consists in using alkynyl acetates, in which the acetyl group is attached to the carbon in the 3-position of the acetylene group.

According to the invention, the reaction medium preferably contains a catalyst formed by a metal salt, particularly a zinc, nickel, cadmium, lead or chromium salt and especially a mercuric salt. The anion of the metal salt can be monovalent or polyvalent; thus, it is possible, for example, to use a chloride, bromide, sulphate, phosphate, formate, acetate, propionate, oxalate, tartrate, etc., and in particular mercuric sulphate. With the exception of the mercuric salts, which had previously been proposed as catalysts for the reaction of an amide with an acetylenic alcohol, the other catalysts according to the invention are novel, and their activity in the synthesis, starting with amides and acetylenic compounds no longer having a free alcohol function, is quite unexpected.

In order to avoid the polymerisation of the acetylenic compound, it is advisable to carry out the reaction according to the invention in the presence of a small proportion of a polymerisation inhibitor.

It may be pointed out that, in the new process, the reaction medium is anhydrous and does not contain any materials capable of producing water during the operation; this fact is of great importance because, from the investigations which resulted in the present invention, the prior process, starting with acetylenic alcohols in carboxylic acid medium, suffered from the partial esterification which seems to be produced during the reaction, thereby liberating water, the effects of which are especially prejudicial to the yield of oxazole.

The reaction according to the invention can be written:

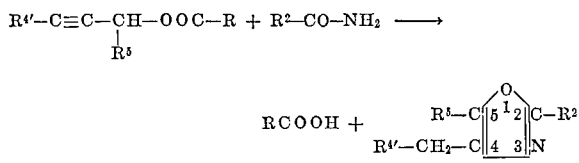

It is seen that the oxazole obtained is monosubstituted in the 4-position when $R^2$ and $R^5$ are hydrogen atoms; when $R^2$ alone is a hydrogen (formamide), the substances substituted in the 4-position by $R^{4'}$—$CH_2$— and in the 5-position by $R^5$. With amides, other than formamide, $R^2$ (saturated or unsaturated aliphatic, optionally substituted cycloaliphatic or aryl radical), being bonded to the carbonate in the 2-position, $R^{4'}$ and/or $R^5$ can be hydrogen atoms: then, if $R^5$ is H, a disubstituted oxazole is obtained in the 2- and 4-positions; if $R^{4'}$ is H, that is to say, for a "true" acetylenic compound, the substituent in the 4-position is a methyl. The oxazole is trisubstituted at 2–4–5, in the case where neither of the symbols $R^2$ nor $R^5$ represents a hydrogen atom. It is to be noted that the residue R—COO— of the carboxylic acid of the ester being used does not participate in the oxazole substitution and the acid liberated can be recovered.

In the particular case of propargyl acetate ($R^5$ and $R^{4'}$ being hydrogen atoms) and of acetamide, the above reaction can be written:

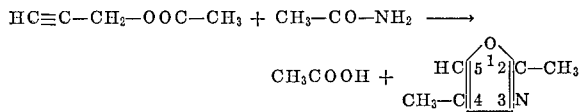

An unexpected fact is that, contrary to the aforementioned reactions, the formation of monosubstituted or disubstituted compounds is greatly reduced when, in accordance with the prior art, the acetylenic alcohol is employed instead of its ester; according to this procedure, no result is obtained with an alcohol of which $R^5$=H, that is to say, a primary alcohol such as prop-1-yn-3-ol.

Among the esters of the acetylenic groups which can be used according to the invention, it is possible to mention the esters of carboxylic acids, such as for example acetic, propionic, butyric, benzoic and other esters, primary or secondary acetylenic alcohols, such as particularly prop-1-yn-3-ol (propargyl alcohol), but-1-yn-3-ol, pent-1-yn-3-ol, non-1-yn-3-ol, hex-1-yn-4-ene-3-ol, ethynyl-phenyl-carbinol, ethynyl - orthochloro - phenyl-carbinol, phenyl-4-but-1-yn-3-ol, diphenyl-1,4-but-1-yn-3-ol, phenyl-1-pent-1-yn-3-ol, etc., these compounds being simply referred to by way of illustration and having no limiting character. In general, the acetylene groups of the reactants which are used generally contain 3 to 18 carbon atoms.

As regards the amides used according to the invention, they can be derived from different carboxylic acids, particularly aliphatic, cycloaliphatic, aromatic, araliphatic and heterocyclic acids, optionally substituted with groups not reacting under the operating conditions of the present invention. The choice of the nature of the amide determines the nature of the substituent $R^2$ of the oxazole to be obtained. It is possible to obtain compounds in which $R^2$ is a hydrogen atom by using formamide, it not having been possible in practice to achieve this by the known method as indicated above.

For example, it is thus possible to employ the amides, such as formamide, acetamide, propionamide, butyramide, isobutyramide, valeramides, caproamide, heptamides, lauramide, acrylamide, crotonamide, benzamide, salicilamide, paranitrobenzamide, ortho-, meta- or para-chlorobenzamide, nicotinamide, phenylacetamide, cyclohexane-carboxylamide, phthalamides, diamides of acids such as adipic, succinic, terephthalic and other acids.

According to a modification of the invention, the amide can be partially or completely replaced by an ammonium salt of the corresponding carboxylic acid, for example, ammonium formate, acetate, propionate, caproate, laurate, acrylate, benzoate, halobenzoate, phthalate, etc.

Depending on the nature of the compounds which are present, it may be necessary to apply different heating temperatures, for example, from 50° to 200° C. and usually between 100° and 150° C.

The catalyst is introduced into the reaction medium, preferably in small quantities, during the heating of this medium; altogether, the quantity of catalyst is generally from 1 to 20 atoms of metal, or better still 3 to 10 atoms, to 100 moles of acetylenic ester.

The invention is illustrated in a non-limiting manner by the particular examples which follow.

EXAMPLE 1

Into a three necked spherical flask, equipped with a mechanical agitator and a reflux condenser, are introduced:

| | Moles |
|---|---|
| 108 g. of but-1-yn-3-ol-acetate, i.e. | 0.955 |
| 60 g. of acetamide, i.e. | 1.015 |
| 5 g. of trichloracetic acid (polymerisation inhibitor) | 0.03 |
| 200 g. of polyphosphoric acid with 115% $H_3PO_4$. | |

The mixture is heated to the boiling temperature of the butynyl acetate, which refluxes from the condenser, i.e. to about 125° to 140° C. Mercuric sulphate is then added in small portions, the total quantity thereof being 20 g. The reaction mixture assumes a blackish colour. The heating with reflux is continued for 5 hours, this being followed by the extraction of the formed product. For this purpose, the contents of the flask, still hot, are poured into a concentrated aqueous solution of caustic potash at 0° C., and the whole is left standing for 12 hours, after which it is subjected to steam distillation. The trimethyl-oxazole driven off decants into the receiving flask. After separation and drying, it is distilled; in this way, 77.5 g. of trimethyl - 2,4,5-oxazole (0.698 mole), boiling at 133–134° C., are collected. The yield, related to the butynyl acetate being used, is then 73%.

EXAMPLE 2

The operations of Example 1 are repeated with 10 g. of $NiCl_2$ as catalyst instead of mercuric sulphate; the yield of trimethyl-oxazole is then 45%.

EXAMPLE 3

Replacing the mercury sulphate of Example 1 by 15 g. of anhydrous cadmium sulphate, the yield obtained is 55%.

EXAMPLE 4

The starting reactants are pent-1-yn-3-ol acetate and acetamide and 5-ethyl-2,4-dimethyloxazole was obtained with a yield of 78% relatively to the acetate.

EXAMPLE 5

The reaction is carried out between propargyl acetate and acetamide. 2,4-dimethyloxazole is thus obtained with a yield of 57% related to the acetate; the product has a boiling point of 104–105° C./760 mm. Its picrate melts at 109–110° C.

EXAMPLE 6

The synthesis of 4,5 - dimethyloxazole was effected from but-1-yn-3-ol formate and formamide. The yield was 60%, relatively to the formate.

EXAMPLE 7

In place of the mercuric salt, the catalyst in Example 1 is formed by 11 g. of ZnCl₂. The yield of trimethyloxazole is found to be 39%.

In the examples which follow, the working conditions are always those of Example 1, but using particular acetylenic esters and amides, which are indicated in each case.

EXAMPLE 8

The starting reactants are propargyl acetate and pivalic amide, that is to say, the amide of trimethyl acetic acid (CH₃)₃C—COOH.

The tertiary-2-butyl-4-methyloxazole, obtained with a yield of 49%, is a new chemical product, boiling at 150° C./760 mm. Hg. Its elementary analysis is:

|  | Percent | | |
|---|---|---|---|
|  | C | N | H |
| Found | 69.14 | 10.08 | 9.03 |
| Calculated | 69.02 | 10.06 | 9.41 |

Characteristic lines of this compound in the infrared were found at:

(microns) 3.34, 3.40, 6.35, 7.51, 7.82, 8.72, 9.09, 10.57, 13.52.

In ultra-violet $\lambda$=216 m$\mu$.

R.M.N.:
  1.37 p.p.m.—singlet for—C(CH₃) (at 2)
  2.12 p.p.m.—doublet for —CH₃ (at 4)
  7.25 p.p.m.—quadruplet for —CH (at 5)

EXAMPLE 9

Starting with propargyl acetate and propionamide CH₃CH₂CONH₂, 2-ethyl-4 - methyloxazole is formed with a yield of 42%, this being a new product with the following characteristics:

Boiling point 126° C./760 mm. Hg.

MICROANALYSIS (PERCENT)

|  | C | N | H |
|---|---|---|---|
| Found | 64.35 | 12.66 | 8.15 |
| Calculated | 64.26 | 12.49 | 8.09 |

Main lines in infra-red: 3.40, 6.20, 6.35, 6.90, 9.10, 9.30, 10.69, 13.60 microns.

Ultra-violet: $\lambda_{max}$=216 m$\mu$

R.M.N.:
  1.22 p.p.m.—triplet—for Me of C₂H₅ (at 2)
  2.07 p.p.m.—doublet—for Me of CH₃ (at 4)
  2.66 p.p.m.—quadruplet—for Me of CH₂ of C₂H₅ (at 2)
  7.22 p.p.m.—quadruplet—for Me of H (at 5)

EXAMPLE 10

2-propyl-4-methyloxazole, a new chemical compound, was obtained by starting with propargyl acetate and n-butyramide CH₃—CH₂CH₂CONH₂, with a yield of 34%.

Its characteristics are:
Boiling point at 149° C./760 mm. Hg.

MICROANALYSIS (PERCENT)

|  | C | N | H |
|---|---|---|---|
| Found | 67.13 | 11.56 | 8.50 |
| Calculated | 67.17 | 11.20 | 8.85 |

Infra-red spectrum: main lines 3.40, 6.38, 9.10, 9.20, 10.22, 10.60, 13.55 microns.

Ultra-violet: $\lambda_{max}$=216 m$\mu$

R.M.N.:
  0.97 p.p.m.—triplet, CH₃ of propyl at 2
  1.80 p.p.m.—multiplet, CH₂, median at 2
  2.08 p.p.m.—doublet, CH₃ at 4
  2.62 p.p.m.—triplet, CH₂ on C at 2
  7.18 p.p.m.—quadruplet, H at 5

EXAMPLE 11

Starting with propargyl acetate and isobutyramide (2-methylpropionamide) (CH₃)₂CH—CONH₂, there has been synthesised the new product, 2-isopropyl-4-methyloxazole, boiling at 140° C./760 mm. Hg, with a yield of 37%.

Microanalysis of this product gave:

|  | Percent | | |
|---|---|---|---|
|  | C | N | H |
| Found | 67.40 | 11.18 | 8.98 |
| Calculated | 67.17 | 11.20 | 8.85 |

Infra-red: 3.34, 6.36, 7.72, 9.14, 10.56$\mu$.

Ultra-violet: $\lambda_{max}$: 216 m$\mu$

R.M.N.:
  1.32 p.p.m.—doublet, the CH₃—'s of isopropyl
  2.08 p.p.m.—doublet, the CH₃ at 4
  2.98 p.p.m.—multiplet, the —CH— of isopropyl
  7.20 p.p.m.—quadruplet, H at 5.

EXAMPLE 12

Using propargyl alcohol and benzamide as initial materials, 2-phenyl-4-methyloxazole was obtained.

EXAMPLES 13 TO 15

Using but-1-yn-yl acetate as the ester, the nature of the amide taken in stoichiometric proportion is caused to vary. The following results are thus obtained.

| No. | Amide used | Oxazole obtained | Yield, percent |
|---|---|---|---|
| 13 | Propionamide | 2-ethyl-4,5-dimethyl | 48 |
| 14 | Butyramide | 2-propyl-4,5-dimethyl | 46 |
| 15 | Isobutyramide | 2-isopropyl-4,5-dimethyl | 50 |

As well as each of these oxazoles, a certain quantity of 2,4,5-trimethyloxazole is formed, which brings the total yield to about 60 to 78% relatively to the initial acetate.

EXAMPLE 16

In Example 1, the acetamide is replaced by 1 mole of anhydrous ammonium acetate (77 g.). 2,4,5-trimethyloxazole is obtained with a yield of 50%.

EXAMPLES 17 TO 21

The working procedure is the same as in Example 1, that is to say, each time 0.955 mole of but-1-yn-3-yl acetate (108 g.) is caused to react with 1.015 mole of acetamide (60 g.) to which are added 5 g. of trichloracetic acid as polymerisation inhibitor, the reaction taking place in 200 g. of polyphosphoric acid with 115% of H₃PO₄. The mixture being brought to boiling point, under reflux of the butynyl acetate, a catalyst is added thereto in small portions, the total quantity of the catalyst being 0.675 mole.

After extraction, separation, drying and weighing the 2,4,5-trimethyloxazole which is obtained, the yield of this compound is calculated relatively to the butynyl acetate which is consumed.

The following table indicates the results found with a series of different catalyst.

| No. | Catalyst | Yield, percent |
|---|---|---|
| 17 | HgCl₂ | 52 |
| 18 | Hg₂SO₄ | 52 |
| 19 | Pb(CH₃COO)₄ | 57 |
| 20 | CrSO₄ | 58 |
| 21 | Without catalyst | 40 |

It is apparent from these examples that tetravalent lead compounds and divalent chromium compounds can catalyse the reaction just as well as mercury.

EXAMPLE 22

Under the general conditions of the foregoing Examples 17 to 21, using mercuric sulphate as catalyst, 1 mole of propargyl acetate HC≡C—CH₂—OOC—CH₃ is caused to react with 1 mole of valeramide CH₃CH₂CH₂CH₂CONH₂. N-2-butyl-4-methyloxazole is obtained with a yield of 51%, related to the propargyl acetate being used. This oxazole, which boils at 178° C./760 mm. Hg, is a new chemical product.

EXAMPLE 23

The operations of Example 22 are repeated with isovaleramide instead of valeramide. The formed new product is 2-isobutyl-4-methyloxazole, boiling at 164° C./760 mm. Hg; the yield of this compound is 38%, relatively to the propargyl acetate consumed.

EXAMPLE 24

The same working procedure as in the foregoing examples is applied to 1 mole of but-1-yn-3-yl acetate with 1 mole of benzamide. 2-phenyl-4,5-dimethyloxazole is then produced with a yield of 48%.

EXAMPLES 25 TO 27

The three following preparations were carried out in accordance with the general working procedure of Example 1 using formamide and an alk-1-yn-3-yl formate.
The following results are obtained:

| No. | Formate of— | Compound obtained | Yield, percent |
|---|---|---|---|
| 25 | Propargyl | 4-methyloxazole | 10 |
| 26 | Pent-1-yn-3-yl | 4-methyl-5-ethyloxazole | 24 |
| 27 | Hex-1-yn-3-yl | 4-methyl-5-propyloxazole | 17 |

EXAMPLES 28 TO 31

Under the conditions of the foregoing examples, but-1-yn-3-yl acetate is caused to react with various amides, with the following results:

| No. | Amide employed | Compound obtained | Yield, percent |
|---|---|---|---|
| 28 | Valeramide | 2-n-butyl-4,5-dimethyloxazole | 54 |
| 29 | Isovaleramide | 2-isobutyl-4,5-dimethyloxazole | 51 |
| 30 | Pivalamide | 2-tert-butyl-4,5-dimethyloxazole | 33 |
| 31 | Salicilamide | 2-hydroxyphenyl-4,5-dimethyloxazole | 22 |

EXAMPLE 32

By the reaction of hex-1-yn-3-yl acetate with acetamide, under the conditions of the foregoing examples, 2,4-dimethyl-5-propyloxazole is obtained with a yield of 56%.

EXAMPLE 33

By causing phenyl-ethynyl-carbinol acetate to react with acetamide under the foregoing conditions, 2,4-dimethyl-5-phenyloxazole is obtained with a yield of 21%.

EXAMPLE 34

Under the foregoing conditions, the cyclisation of but-1-yn-3-yl paratoluene sulphonate with acetamide led to a violent reaction, and trimethyloxazolone was obtained with a yield of 18%, relatively to the butynyl paratoluene sulphonate which was used.

What is claimed is:
1. A process for the preparation of a substituted oxazole comprising (a) condensing in an anhydrous medium (1) an acetylenic compound which is an ester having the formula

HC≡C—CHOXR
|
R⁵

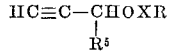

wherein

R⁵ is selected from the group consisting of hydrogen, alkyl having 1 to 15 carbon atoms and phenyl;
X is selected from the group consisting of

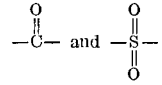

R is selected from the group consisting of hydrogen, alkyl having 1 to 3 carbon atoms, phenyl and para-tolyl when X is

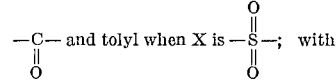

(2) an amide of the formula R² CONH₂, where

R² is selected from the group consisting of hydrogen, alkyl having 1 to 4 carbon atoms, phenyl and hydroxyphenyl;

to obtain a condensation product and (b) recovering said product.

2. A process according to claim 1 wherein the condensation takes place in anhydrous liquid polyphosphoric acid.

3. A process according to claim 1 wherein the contents of reactants in the liquid is from 10 to 70% by weight and the reaction medium is kept at 50 to 200° C.

4. A process according to claim 1 including the step of neutralizing the reaction mixture with a base in aqueous solution and steam distilling the oxazole to separate the same.

5. A process according to claim 1, wherein there is employed as a catalyst AB, wherein A is selected from the group consisting of Zn, Ni, Hg, Cd, Pb and Cr and B is selected from the group consisting of chloride, bromide, sulfate, phosphate, formate, acetate, propionate, oxalate and tartate.

6. A process according to claim 5 wherein the catalyst is a mercuric salt.

7. A process according to claim 6 wherein the salt is mercuric sulfate.

8. A process according to claim 5, wherein the acyl group is acetyl, the reaction is carried out in anhydrous polyphosphoric acid at a temperature of 50 to 200° C. and the amide is selected from the group consisting of acetamide, formamide, propionamide, butyramide, isobutyramide, benzamide and salicilamide.

9. A process according to claim 1 wherein R is hydrogen, phenyl or alkyl and X is

10. A process according to claim 9 wherein RX is formyl, acetyl, propionyl or butyryl.

11. A process according to claim 1 wherein the condensation is carried out in the presence of a polymerization inhibitor.

References Cited

UNITED STATES PATENTS

| | | | |
|---|---|---|---|
| 3,112,291 | 11/1963 | Anderson | 260—45.8 |
| 3,279,918 | 10/1966 | Cassiers et al. | 96—1 |

FOREIGN PATENTS

| | | |
|---|---|---|
| 3,910,130 | 10/1964 | Japan. |
| 1,340,996 | 9/1963 | France. |

ALEX MAZEL, Primary Examiner
R. V. RUSH, Assistant Examiner